United States Patent
Bonnet

[11] Patent Number: 5,868,238
[45] Date of Patent: Feb. 9, 1999

[54] HIGH SPEED SMART DIVERTER FOR A CONVEYOR SORTER

[75] Inventor: Henri Bonnet, Atlanta, Ga.

[73] Assignee: United Parcel Service of America, Inc., Atlanta, Ga.

[21] Appl. No.: 846,185

[22] Filed: Apr. 25, 1997

[51] Int. Cl.⁶ .................................................. B65G 37/00
[52] U.S. Cl. .................................... 198/370.1; 198/370.09
[58] Field of Search ........................... 198/370.1, 370.09, 198/370.01, 773

[56] References Cited

U.S. PATENT DOCUMENTS

| | | |
|---|---|---|
| Re. 25,673 | 11/1964 | Burt . |
| 3,138,238 | 6/1964 | De Good et al. . |
| 3,219,166 | 11/1965 | Collins et al. . |
| 3,291,279 | 12/1966 | De Good et al. . |
| 3,303,923 | 2/1967 | Davis . |
| 3,334,723 | 8/1967 | Reed et al. . |
| 3,608,713 | 9/1971 | Crosby . |
| 3,910,402 | 10/1975 | Dean . |
| 3,926,298 | 12/1975 | Miller et al. . |
| 3,983,988 | 10/1976 | Maxted et al. . |
| 4,174,774 | 11/1979 | Bourgeois . |
| 4,180,150 | 12/1979 | Moore ................................ 198/370.09 |
| 4,264,002 | 4/1981 | Van Der Schie . |
| 4,633,996 | 1/1987 | Waterhouse . |
| 4,730,718 | 3/1988 | Fazio et al. . |
| 4,746,003 | 5/1988 | Yu et al. . |
| 4,792,034 | 12/1988 | Leemkuil . |
| 4,798,275 | 1/1989 | Leemkuil et al. . |
| 4,962,841 | 10/1990 | Kloosterhouse . |
| 4,979,606 | 12/1990 | Usui . |
| 5,012,914 | 5/1991 | Berends et al. . |
| 5,029,693 | 7/1991 | Williams . |
| 5,117,961 | 6/1992 | Nicholson . |
| 5,165,516 | 11/1992 | Reed et al. . |
| 5,333,722 | 8/1994 | Ouellette . |
| 5,551,543 | 9/1996 | Mattingly et al. . |

FOREIGN PATENT DOCUMENTS

| | | |
|---|---|---|
| 0 477 104 A2 | 3/1992 | European Pat. Off. . |
| 2140070 | 1/1973 | France . |
| 58183521 | 10/1983 | Japan . |
| 63315409 | 12/1988 | Japan . |
| 02013509 | 1/1990 | Japan . |
| 02305712 | 12/1990 | Japan . |
| 1359064 | 7/1974 | United Kingdom . |

*Primary Examiner*—Joseph E. Valenza
*Assistant Examiner*—Khoi H. Tran
*Attorney, Agent, or Firm*—Jones & Askew, LLP

[57] ABSTRACT

A conveyor sorter includes diverter stations for diagonally diverting parcels at high speed to either side of the conveyor, or passing the articles straight through without diversion. Each station provides two diverters interleaved or superimposed in the same space, the diverters providing diverting forces toward opposite sides of the conveyor These diverters can be cycled to provide a net motion straight through the diverter station, or operated individually to divert parcels off a selected side of the conveyor. The diverters can also be used to center parcels passing through a diverter station

20 Claims, 4 Drawing Sheets

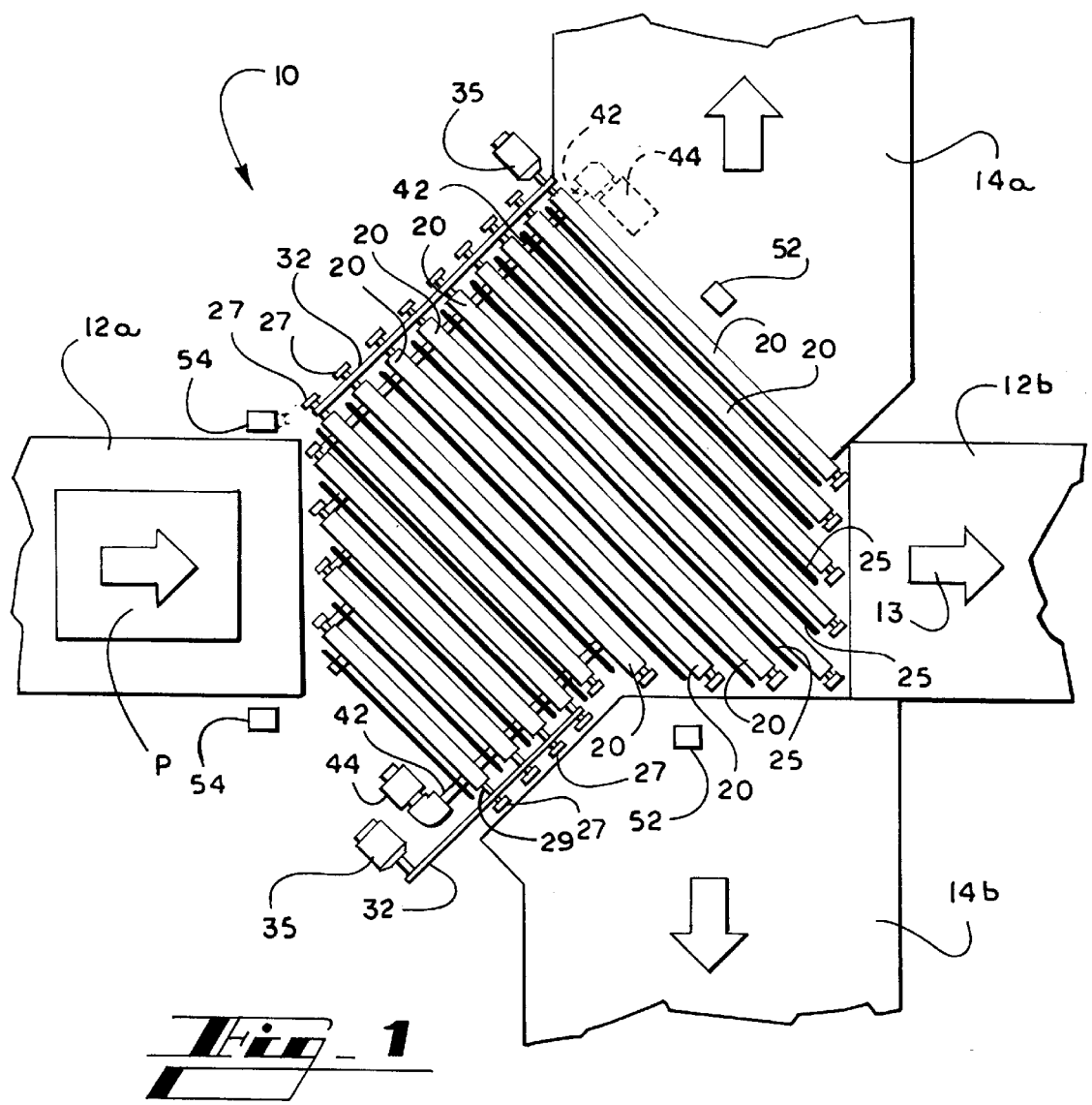
Fig_1
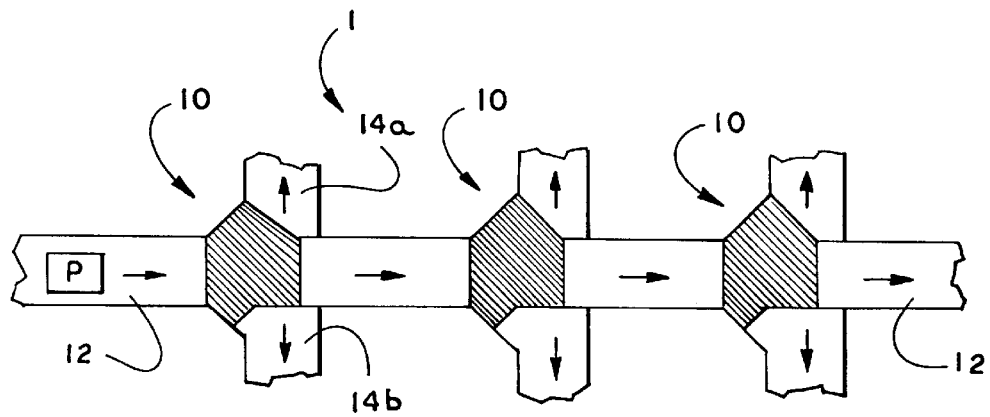
Fig_2

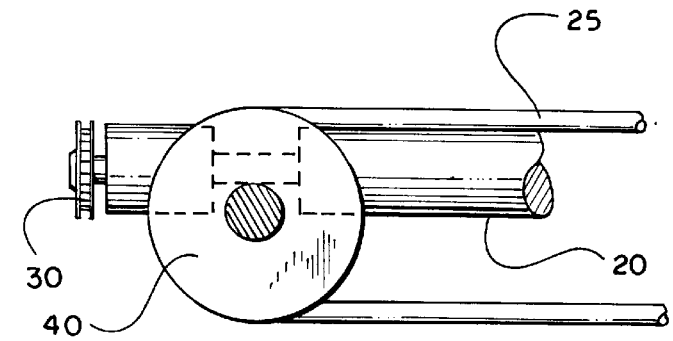
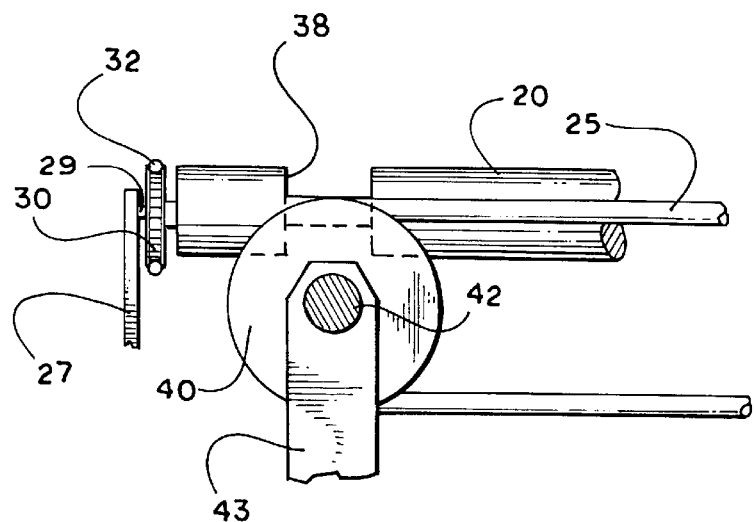
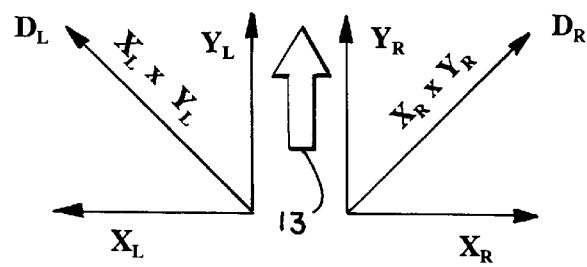
ROLLERS 20　　　BELTS 25
(A)　　　　　　(B)

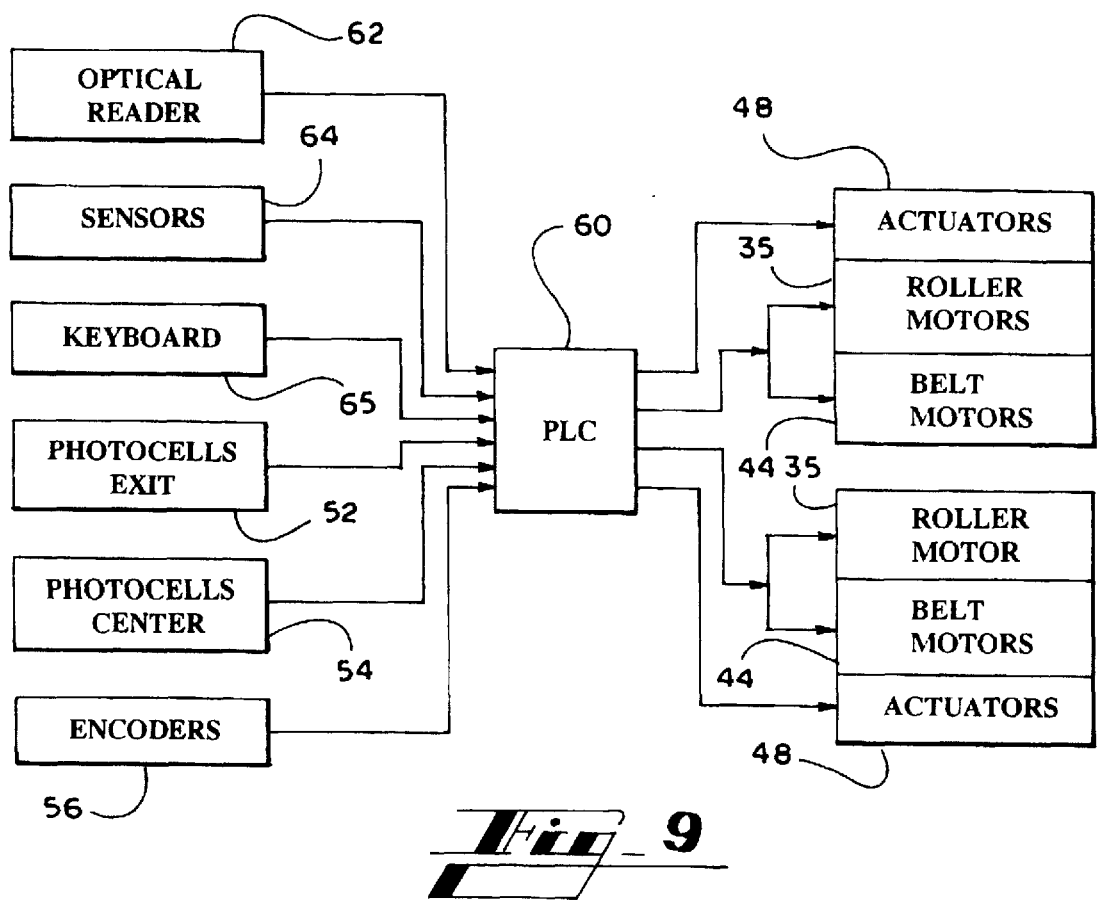
Fig_9
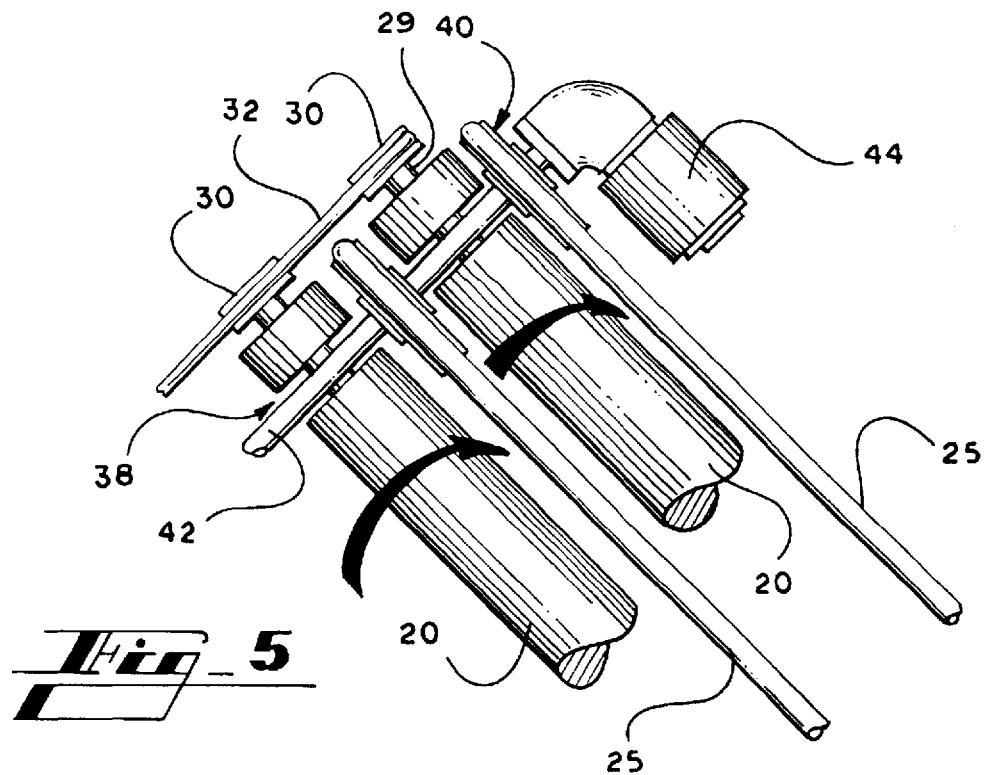
Fig_5

HIGH SPEED SMART DIVERTER FOR A CONVEYOR SORTER

TECHNICAL FIELD

The present invention relates to a conveyor diverter for sorting articles, such as parcels, by diverting them off a conveyor into destination locations, and more particularly relates to such a conveyor sorter including diverter stations for diagonally diverting parcels at high speed to either side of the conveyor, or passing the articles straight through without diversion.

BACKGROUND ART

Package delivery companies pick up millions of packages daily from thousands of locations over a large geographical area and transport them, primarily by truck and airplane, to a correspondingly large number of scattered destinations. To meet a rigorous schedule and provide accurate deliveries, a package delivery company must use automated transfer systems to match incoming packages with proper outgoing transport headed for the packages' destinations. Because deliveries are time sensitive, the sorting equipment must be very fast, yet provide gentle and accurate handling of packages.

Belt and roller conveyor systems have often been used in package sorting systems to move packages from incoming loading docks to outgoing transport. A initial sorting of packages traveling along a conveyor may be accomplished by diverting packages from the conveyor based on their destinations, or based on their size or another characteristic.

To automate handling of articles in conveyor systems, conveyor diverter assemblies of various types have been developed. Roller bed diverters using right angle transfer belts are shown in U.S. Pat Nos. 4,798,275 to Leemkuil et. al., and 4,174,774 to Bourgeois. However, these diverter systems divert articles at right angles to the primary conveyor direction of travel. Therefore, the article must be slowed so that it may be frictionally engaged by transfer belts for the radical right angle change of direction. If the article is traveling at high speed, it may slide through the diverter, out of control, before it can be diverted. Thus, production speed must be sacrificed for accuracy in the sorting process.

Other diverter systems have been developed to divert the articles from the main conveyor diagonally. U.S. Pat. No. 3,219,166, discloses a main conveyor consisting of cone-shaped, powered rollers, positioned so that the large diameter end alternates one on the left side, next on the right. All the rollers with the large end on the left are linked and can be lowered together, and the same is true for the rollers with the large end on the right. When both left and right sets are elevated, the net force on the parcels is straight. When one set is lowered, the other set acts on the parcel and diverts it off the main conveyor at an angle. Although both the left and right set of rollers can act on the parcels simultaneously, each set on its own has only a small tendency to turn and slide the parcels toward the side, resulting from the taper of the rollers. There is no direct force driving the parcels in the direction of one of the discharge conveyors positioned along the main conveyor.

U.S. Pat. No. 5,551,543 shows a sorter with angled rollers to divert parcels at an angle. In one embodiment, the parcels are either carried straight through on chains, or lowered onto diverting idler rollers while being pushed. In another version, steerable idler rollers guide the parcel either straight or off to the side. In another version, the angled idler rollers are shifted up into contact with the parcels. In a final version, there are two sets of idler wheels arranged at different angles, one of which is vertically movable. At any particular output location along the main conveyor path, the products can only be diverted to one side of the path.

U.S. Pat. No. 3,608,713, has a main conveyor consisting of angled, powered rollers mounted to travel with a chain drive. If a parcel is to move straight with the conveyor, the rollers do not rotate. If the parcel is to be diverted, the powered rollers are activated to divert the parcel without slowing the chain drive. The apparatus only diverts in the direction the rollers are angled, and requires a complex mechanism to carry all the rollers with the chain conveyor.

U.S. Pat. No. 3,926,298, provides a main conveyor having multiple powered wheels, and a diagonal belt conveyor fitted between the wheels below the normal conveyor surface. A section of the drive rollers can be lowered to drop a parcel onto the belt conveyor, without interrupting the speed of articles moving along the primary path. However, the belt conveyor can divert in only one direction.

Thus, there is a need in the art for a diverter that can directly and forcefully drive a parcel diagonally to either side of a main conveyor path, or pass the parcel straight through the diverter location, all while operating at a high speed of throughput along the main path.

SUMMARY OF THE INVENTION

The present invention seeks to provide an improved diagonal conveyor diverting system capable of operating at high conveyor speed and selectively carrying articles to either side of a main conveyor or straight through the diverting location.

In accordance with the invention, this object is accomplished by providing a system and method for transferring articles moving along a conveyor, including a first diverter aligned to carry articles in a first diverting direction leading off one side of the conveyor; a second diverter aligned to carry the articles in a second diverting direction leading off the opposite side of the conveyor; and a controller selectively operative to (a) operate the first diverter to transfer an article off one side of the conveyor, (b) operate the second diverter to transfer an article off the opposite side of the conveyor, and (c) alternate operation of the first and second diverters sufficiently rapidly to carry the articles effectively straight along the conveyor.

The controller preferably can coordinate the cycling of operation of the first and second diverters to move the articles, such as parcels, in any desired direction. However, in a preferred embodiment, the first diverter directly carries the articles along a path 45 degrees to the left of the main conveyor path, and the second diverter directly carries the articles along a path 45 degrees to the right. In this embodiment, the first diverter may be a plurality of spaced apart driven rollers, mounted for rotation about roller axes oriented such that the rollers carry the articles in the first diverting direction; and the second diverter comprises transfer carriers, such as belts, positioned between the rollers and selectively liftable above the rollers, the carriers being operative to carry the articles in the second diverting direction. The rollers and transfer carriers preferably operate at the same speed.

The controller may receive input information relating to the destination of the articles and automatically operate the diverters to sort the articles. For example, the destination information may be read by an over-the-belt optical symbol or OCR reader and sent to the controller. The controller can then compare the destination information to stored data relating destinations to output chutes or conveyors along the main conveyor, and operate a diverter to move the article into the proper output location.

Multiple diverter stations may be utilized along the same main conveyor, either intermittently or one after the other.

The present invention also provides a method of transferring articles, comprising the steps of conveying the articles in a primary direction into a diverting mechanism; and in the diverting mechanism, selectively (a) moving the articles in a first diverting direction leading off one side of the conveyor at an acute angle, (b) moving the articles in a second diverting direction leading off an opposite side of the conveyor at an acute angle, or (c) alternately moving the articles in the first and second diverting directions at a cycle rate sufficiently rapid to carry the articles effectively in the primary direction

BRIEF DESCRIPTION OF THE DRAWINGS

FIG. 1 shows a top plan view of a diverter station embodying the present invention.

FIG. 2 shows a top diagrammatic view of a sorting system incorporating diverter stations embodying the present invention.

FIG. 3 is a partial side view of a raised belt diverter positioned beside a roller, as such configuration occurs in the diverter station of FIG. 1.

FIG. 4 is a partial side view of the belt and roller of FIG. 3, with the belt lowered.

FIG. 5 is a partial bottom view of the diverter station of FIG. 1, showing drive mechanisms for the rollers and belts.

FIG. 8 is a vector diagram showing the speeds and directions that can be imparted to a parcel by the diverter station of FIG. 1.

FIG. 9 is a block diagram of a control circuit for operating the diverter stations of a sorting system as shown in FIGS. 1–8.

DETAILED DESCRIPTION

Figure 6:
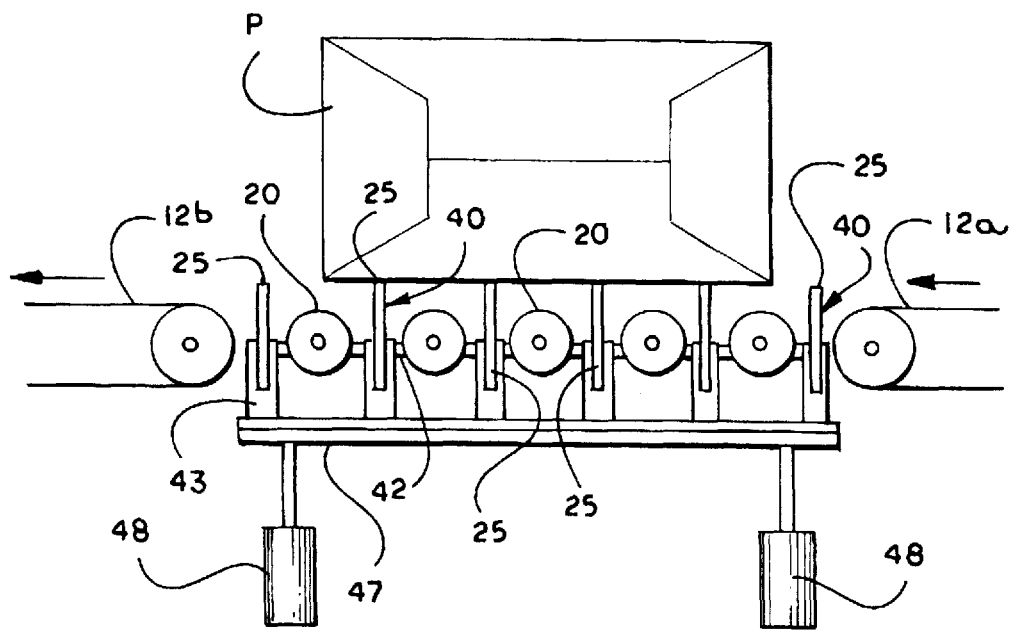
FIG. 6 is a diagrammatic side view of the diverter station of FIG. 1, with the belt diverter elevated to engage a parcel.

Referring now in more detail to the drawings, in which like numerals refer to like parts throughout the several views, FIG. 1 shows a diverter station 10 embodying the present invention. One or more diverter stations 10 may be incorporated in a conveyor sorter 1 as shown in FIG. 2, between sections of a linear main conveyor 12. The main conveyor moves objects, such as parcels P, in the direction of arrows 13. Each diverter station 10 receives parcels P from an input end 12a of a section of the conveyor 12, and discharges the parcel in one of three directions, namely, to the left into an output chute 14a, to the right into an output chute 14b, or straight through to an input end 12b of the next section of the conveyor 12. It will be understood that one or both of the output destinations 14a and 14b may be conveyors, receptacles, or the like, rather than chutes.

The diverter stations 10 combine a pair of diverters in the same footprint. The first diverter comprises an array of parallel, stationary, powered rollers 20. The rollers 20 are lagged with a high friction coating such as rubber. The rollers 20 are spaced apart, preferably by about one inch, and each has an axis of rotation oriented at 45 degrees from the direction of motion 13 of the conveyor 12. As described in detail below, when a parcel is engaged on the roller array, the rotation of the rollers drives the parcel directly along a path 45 degrees to the left of the conveyor motion 13, into the output chute 14a.

Figure 7:
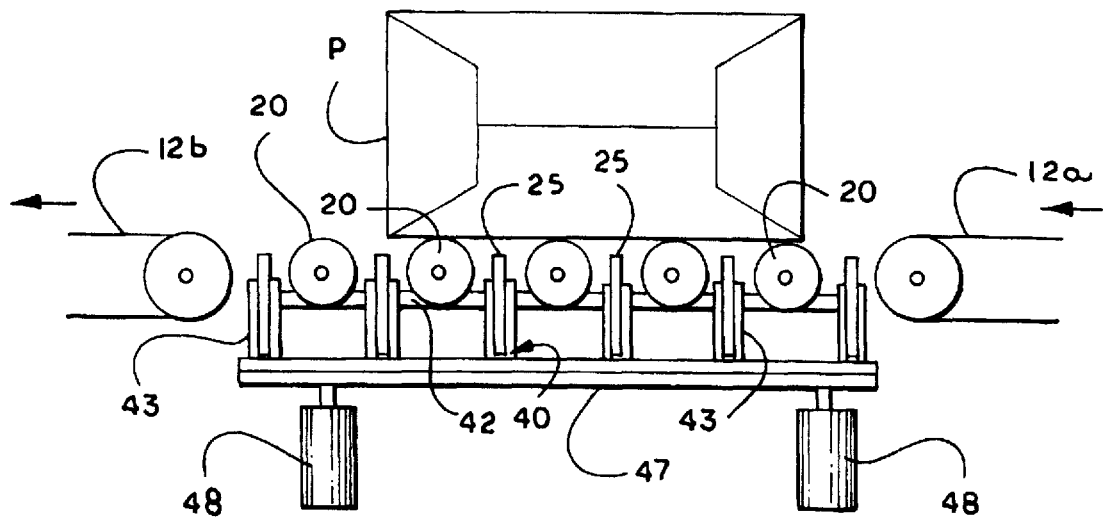
FIG. 7 is a diagrammatic side view of the diverter station of FIG. 1, with the belt diverter lowered to allow the roller diverter to engage a parcel.

The second diverter comprises an array of parallel, powered belts 25 installed one between every pair of adjacent rollers 20. In some systems, one belt for every two or every group of rollers may be sufficient. The belts 25 also have a high friction outer surface. The belts are mounted together in a manner described below for vertical movement between a raised position in which they are preferably about one-quarter inch (about 6 mm) above the rollers 20, as shown in FIGS. 3 and 6, and a lowered position in which they are below the rollers 20, as shown in FIGS. 4 and 7, preferably by about the same distance. The belts 25 are driven to move parallel to the rollers 20, and therefore drive a parcel resting on the raised array of belts directly along a path normal to that of a parcel on the rollers 20. The belts thus drive parcels 45 degrees to the right of the conveyor motion 13, into the output chute 14b.

It should be understood that an angle other that 45 degrees from the conveyor motion 13 can be chosen for the orientation of the axes of the rollers 20 and the path of belts 25.

The majority of the array of rollers 20 extend beyond the left side of the conveyor 12 so their ends are aligned, as shown in FIG. 1, allowing them to be driven together in a manner best shown in FIG. 5. Roller drive shafts 29 extend from the ends of each roller 20 and are journaled in bearings (not shown) held in support posts 27. At the aligned ends, notched pulleys 30 are fixed to the drive shafts 29, and a cog belt or timing belt 32 is fit in the notches of all the aligned pulleys 30. A motor 35 is operatively connected to rotate one of the drive shafts 29, which drives the remainder of the rollers 20 at the same speed via the timing belt 32.

A smaller number of the rollers 20 extend beyond the right side of the conveyor 12 so as to be aligned with a second timing belt 32 driven by a second motor 35. The speed of the two motors 35 is coordinated electronically or mechanically in a manner known to those skilled in the art. It should be understood that the extension of the rollers 20 and belts 25 beyond the sides of the conveyor is for convenience in providing a common drive mechanism. It would be possible to terminate all the rollers and belts even with the sides of the conveyor and still provide a coordinated drive mechanism.

The diverter belts 25 extend to the left and to the right in the same manner as the rollers 20. Each continuous belt 25 is carried by a pair of sheaves or pulleys 40 at opposite ends of the belt. The pulleys 40 are supported by support posts 43. The pulleys 40 at the aligned ends of the belts are all carried on a common drive shaft 42, as shown in FIGS. 3 and 4. A gear motor 44 drives the shaft 42 to operate all the belts 25 at the same speed. Again, duplicate belt drive mechanisms are found on both sides of the conveyor, and their speed is coordinated with each other and with the peripheral speed of the rollers 20.

The support posts 43 are all mounted on a common elevator carriage or frame 47 beneath the diverter station 10. Shown diagrammatically in FIGS. 6 and 7, the frame 47 can be moved up and down by pneumatic or electric actuators 48. The raised position of the belts 25 when the actuators 48 are extended is shown in FIGS. 3 and 6. The upper run of the belt 25, extending from the pulleys 40, is above the plane of the array of stationary rollers 20. Because the shaft 42 extends under the rollers 20, it could interfere with the rollers when the frame 47 and shaft 42 are raised. Therefore, annular notches 38, best shown in FIGS. 3 and 4, are formed in the rollers 20 at the location of the shaft 42. When the shaft 42 raises, it enters the notches 38 as shown in FIG. 3, without interfering with the rollers 20, which are continuously rotating.

In the alternative, the mounting of the rollers 20 and belts 25 may be done generally in the manner shown in U.S. Pat. No. 4,798,275 or U.S. Pat. No. 4,174,774, both of which are incorporated herein by reference.

In each of the output chutes, 14a and 14b, an exit confirmation photocell 52 is positioned adjacent to where parcels leave the diverting rollers 20 or belts 25. The photocells 52 are retro-reflective photocells that provide a signal when a parcel passes over the photocells. Additional triangular beam photocells 54 are positioned astride the input conveyor end 12a just upstream of the entrance to the diverter station 10, to measure the transverse position of the parcels P as they enter the diverter station 10. This measurement is for alignment purposes as described below. A signal from the photocells 54 also indicates a parcel is entering the diverter station. Optionally, additional photocells (not shown) could be positioned just downstream of the diverter stations 10 to provide a signal when parcels exit the diverter stations onto the output end 12b of the following section of the conveyor 12.

Referring to the block diagram of FIG. 9, the operation of the diverter station 10 is automated through the use of a digital controller, such as a programmable logic controller 60 (PLC), or a general purpose computer, typically having an appropriate microprocessor. The PLC 60 may receive input signals from an optical reader 62 that reads barcode or two-dimensional symbols (such as MaxiCode symbols) on labels on the parcels P. Such a symbol may contain address information which allows the PLC to determine, in a well known manner, which output chute is the correct chute at which to discharge the parcel. The PLC 60 may also receive information about the parcel directly from sensors 64, such as a scale or a device for measuring the dimensions of the parcel. A set of rotary belt encoders 56 are positioned to measure the displacement of each section of the conveyor 12, and the output of these encoders is input to the PLC 60. Parcel information also may be manually entered at a keyboard 65. The PLC 60, in response to these input signals, sends control signals to each of the diverter stations individually, to operate the motors 35 which rotate the rollers 20, the motors 44 which drive the belts 25, and the actuators 48 that lift and lower the belts 25.

In operation of a sorter system 1 incorporating a plurality of diverter stations 10, parcels P are placed on the conveyor 12. The PLC receives input from the rotary belt encoders 56 associated with the conveyor 12, and from the optical reader 62 or an alternative label reader or manual input device. The optical reader or other input device is used to acquire destination data about each package as the package is placed onto the sorting system. Any bar codes or other symbols on a parcel are detected and decoded. Destination information may be embedded in a dense code, or may be stored in a database location the address of which is contained in a bar code. Furthermore, textual address information on the parcel label can be analyzed using OCR techniques.

It should be understood that the present invention can utilize a feed mechanism, or the parcels can be placed manually onto the conveyor 12.

When a package is imaged at the reader 62, the current count of the first encoder 56 is obtained. The rotary encoder device 56 allows the PLC to track how far the section of the conveyor 12 has traveled since any particular package was input onto that section. Furthermore, by monitoring which conveyor section the parcel has reached, the PLC can track the location of each parcel as it moves along the conveyor 12 and through diverter stations 10. More specifically, the photocells 54 inform the PLC when a parcel leaves a conveyor section and enters a diverter station. If the parcel is not scheduled for discharge from that station, the PLC can add the time required for traversing a diverter station to the encoder count and resume monitoring with the next encoder associated with the next conveyor section. Or, a photocell can be placed at the entry to the next conveyor section to monitor the entry of the parcel.

A suitable optical reader system for imaging labels is shown in U.S. Pat. No. 5,291,564; 5,308,960; 5,327,171; and 5,430,282 which are incorporated herein by reference. Systems for locating and decoding bar codes and the MaxiCode dense code symbology are described in U.S. Pat. Nos. 4,874,936; 4,896,029; 5,438,188; 5,412,196; 5,412,197; 5,343,028; 5,352,878; 5,404,003; 5,384,451 and PCT Publication No. WO 95/34043, respectively, all of which are incorporated herein by reference.

A record for each package stored in the PLC memory may contain the parcel identification, destination address, and package characteristics. A description of the contents of the parcel, its dimensions and weight, or a code indicating the contents are fragile or hazardous or have some other special status, may be stored.

In the initial or default state of the sorting system, the diverter stations 10 are all operated to send parcels straight through without diversion. The roller motors 35 and belt motors 44 preferably are operated continuously while the system is being used, and are coordinated to run at approximately the same peripheral speed. This may be the speed of the conveyor 12, which may be, for example, about 500 feet per minute (about 150 meters per minute), or it may be faster than the conveyor. To send parcels straight through, the PLC sends signals to cycle the belt actuators 48 to elevate the belts 25 one-half of the time. Referring to FIG. 8, a vector diagram, the rollers 20 impart a speed $D_L$ to the parcels at 45 degrees to the left, while the belts 25 impart a speed D R to the parcels at 45 degrees to the right. The vectors have equal but opposite components in the X direction transverse to the conveyor; and equal components in the Y direction, both in the direction of travel of the conveyor.

To send parcels straight through without diversion, the rollers and belts typically cycle equally and repetitively. The preferred cycle is one second elevated alternating with one second lowered, although the cycle time can be varied according to the weight or size of the parcels. In turn, the rollers 20 and belts 25 move the parcel in the direction $D_L$ and then in the direction DR respectively. As each diverter operates, the speed imparted in the straight through direction is $Y_L$ or $Y_R$, which are both equal to $$D \times cos(45 \text{ degrees})$$

in the preferred embodiment. The straight through speed may be set or varied as desired If the conveyor speed and the roller and belt speed are 500 feet per minute (about 150 meters per minute), the speed straight through the diverter station will be about 350 feet per minute (about 107 meters per minute) The speed of the rollers and belts may, for example, be increased by the PLC for straight through operation to raise the effective straight through speed to be equal to the conveyor speed. Also, the speed of the rollers and belts may be set or varied based on the nature or weight of the parcels being diverted. The PLC may be programmed so that the roller and belt speed for diverting a parcel may be different than the roller and belt speed at the same diverter station for straight through operation.

Of course, if the angle of the rollers and belts is not 45 degrees with respect to the conveyor motion, the timing will be adjusted so that the net force is along the path of conveyor motion when sending the parcels straight through.

The diverter stations 10 have the capability to center the parcels as the parcels pass through. The photocells 54 are positioned to measure the distance of each side of the parcel from the respective side of the conveyor 12. If these distances differ by more than a predetermined amount, for example, by more than ten per cent, the PLC adjusts the cycle time so that the parcel will be centered as it exits the diverter station 10. For example, if the parcel is off center toward the left side, the PLC will cause the belts 25 to be elevated in each cycle slightly longer than they are lowered, depending on how far off center the parcel is. This will result in a net movement of the parcel to the right. If the parcel is off center toward the right, the belts will be lowered longer than they are raised.

Once the destination information for the package is known, the PLC 60 looks up in an appropriate part of its memory the proper output chute 14*a* or 14*b* corresponding to the package's destination, and the diverter station 10 associated with that output chute, as well as the identity of the conveyor section preceding that diverter station. Preferably, this information is stored in fields of the record already created for the package.

In a known manner, the PLC 60 determines when a parcel is approaching a diverter station 10 at which the parcel should be discharged. At such times, the PLC provides control signals instructing the actuators 48 how to position the belts 25 into or out of their operative, raised position. The PLC reads the encoder counts and photocell 54 signals as the parcel travels, and compares this position information to the discharge location information stored in memory. When the PLC receives signals indicating that the parcel has reached a conveyor section immediately preceding a diverter station 10 from which the parcel should be discharged, the PLC sends control signals to the actuator 48 of that station. If the parcel must go to output chute 14*a*, on the left, then the PLC causes the belts 25 to remain lowered. The rollers 20 alone move the parcel with the force $D_L$ into the output chute 14*a*. Similarly, if the parcel must go to output chute 14*b*, on the right, then the PLC causes the belts 25 to remain raised. The belts 25 alone move the parcel with the force $D_R$ into the output chute 14*b*. After the actuator 48 receives a command signal from the PLC, the state of the actuator 48 may be retained until a change is needed.

Those skilled in the art will understand that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

In an alternative embodiment, not shown, the diverter stations may be positioned adjacent to one another without intervening conveyor belt sections. In this embodiment, the parcels move directly from one diverter station to the next until they are discharged, and the photocells 54 are positioned at the boundary between diverter stations.

From the foregoing, those skilled in the art will understand that the present invention provides a diverter for a conveyor sorting system that can directly and forcefully drive a parcel diagonally to either side of a main conveyor path, or pass the parcel straight through the diverter location, all while operating at a high speed of throughput along the main path. This is accomplished by providing two diverters interleaved or superimposed in the same space, and providing diverting forces toward opposite sides of the conveyor. These diverters can be cycled to provide a net motion straight through the diverter, or operated individually to divert parcels off a selected side of the conveyor.

While this invention has been described in detail with particular reference to a preferred embodiment thereof, it will be understood that modifications and variations may be made without departing from the scope of the invention as defined in the appended claims.

What is claimed is:

1. An article transferring apparatus, comprising:
   a conveyor positioned to carry articles in the direction of a longitudinal axis of said conveyor;
   said conveyor including a diverter station, comprising:
      a first diverter aligned to carry said articles at a first acute angle to said longitudinal axis of said conveyor in a first diverting direction leading off one side of said conveyor;
      a second diverter aligned to carry said articles at a second acute angle to said longitudinal axis of said conveyor in a second diverting direction leading off the opposite side of said conveyor; and
      a controller selectively operative to (a) operate said first diverter to transfer an article off said one side of said conveyor, (b) operate said second diverter to transfer an article off said opposite side of said conveyor, and (c) alternate operation of said first and second diverters sufficiently rapidly to carry said articles effectively along said longitudinal axis of said conveyor.

2. The apparatus of claim 1, wherein said first diverter comprises a plurality of spaced apart driven rollers, mounted for rotation about roller axes oriented such that said rollers carry said articles in said first diverting direction; and wherein said second diverter comprises transfer carriers positioned between said rollers and selectively liftable above said rollers, said carriers being operative to carry said articles in said second diverting direction.

3. The apparatus of claim 2, wherein said first and second angles are normal to one another.

4. The apparatus of claim 3, wherein said first and second angle are both approximately forty-five degrees.

5. The apparatus of claim 2, wherein said transfer carriers comprises transfer belts mounted on a vertically movable carriage.

6. The apparatus of claim 5, wherein said rollers and said transfer belts operate at the same speed.

7. The apparatus of claim 1, wherein said controller is operative to receive destination information for each article, and to operate said diverters responsive to said destination information.

8. The apparatus of claim 7, further comprising an optical reader positioned to read destination information printed on a label on said articles.

9. The apparatus of claim 8, further comprising means for determining the transverse position of said articles entering said diverter station, and wherein said controller operates said first and second diverters to center said article.

10. An apparatus for diverting articles entering said apparatus in an initial direction of motion, comprising:

a first diverter aligned to carry said articles at a first acute angle to said initial direction of motion in a first diverting direction leading to a first output destination;

a second diverter aligned to carry said articles at a second acute angle to said initial direction of motion in a second diverting direction leading to a second output destination; and a controller selectively operative to (a) operate said first diverter to transfer an article to said first output destination, (b) operate said second diverter to transfer an article to said second output destination, and (c) alternate operation of said first and second diverters sufficiently rapidly to carry said articles effectively in said initial direction.

11. The apparatus of claim 10, wherein said first diverter comprises a plurality of spaced apart driven rollers, mounted to carry said articles in said first diverting direction; and wherein said second diverter comprises transfer carriers positioned between said rollers and selectively liftable above said rollers, said carriers being operative to carry said articles in said second diverting direction.

12. An article transferring apparatus, comprising:

a conveyor positioned to carry articles in the direction of a longitudinal axis of said conveyor;

said conveyor including a diverter station, comprising:

first diverter means for selectively carrying said articles in a first diverting direction leading off one side of said conveyor at an acute angle;

second diverter means for selectively carrying said articles in a second diverting direction leading off an opposite side of said conveyor at an acute angle; and control means for selectively alternating the operation of said first and second diverter means sufficiently rapidly to carry said articles effectively along said longitudinal axis of said conveyor.

13. A method of transferring articles, comprising the steps of:

conveying said articles in a primary direction into a diverting mechanism; and in said diverting mechanism, selectively (a) moving said articles in a first diverting direction leading off one side of said conveyor at an acute angle, (b) moving said articles in a second diverting direction leading off an opposite side of said conveyor at an acute angle, or (c) alternately moving said articles in said first and second diverting directions at a cycle rate sufficiently rapid to carry said articles effectively in said primary direction.

14. The method of claim 13, wherein said first and second diverting directions are at approximately normal acute angles from said primary direction.

15. The method of claim 14, wherein said first and second diverting directions are at approximately forty-five degree angles from said primary direction.

16. The method of claim 13, wherein said step of alternately moving said articles in said first and second diverting directions comprises moving said articles at the same speed in both said first averting direction and alternately in said second diverting direction.

17. The method of claim 13, further comprising the step of receiving destination information for each article, and wherein said step of selectively moving said articles in said diverting mechanism comprises selecting the manner of moving said articles in response to said destination information.

18. The method of claim 13, further comprising the steps of:

determining the transverse position of articles entering said diverting mechanism; and in step (c), adjusting the alternate movement of said articles to center said articles.

19. The method of claim 13, further comprising the step of moving said articles in steps (a) and (b) at a speed different from the speed of conveying said articles into said diverting mechanism.

20. The method of claim 13, further comprising the step of moving said articles in step (c) in said primary direction at a speed different from the speed of moving said articles in steps (a) and (b).

* * * * *